United States Patent [19]

Anand et al.

[11] Patent Number: 4,976,948
[45] Date of Patent: Dec. 11, 1990

[54] PROCESS FOR PRODUCING FREE-FLOWING CHROMIUM OXIDE POWDERS HAVING A LOW FREE CHROMIUM CONTENT

[75] Inventors: Vidhu Anand, Sayre; David L. Houck, Towanda; Dennis C. Smouse, Monroeton, all of Pa.

[73] Assignee: GTE Products Corporation, Stamford, Conn.

[21] Appl. No.: 416,754

[22] Filed: Sep. 29, 1989

[51] Int. Cl.$^5$ .................................................. C01G 37/02
[52] U.S. Cl. ............................. 423/607; 423/DIG. 10
[58] Field of Search ........................ 423/607, DIG. 10; 75/0.5 B, 0.5 A, 3, 10.25, 10.19

[56] References Cited

U.S. PATENT DOCUMENTS

| | | | |
|---|---|---|---|
| 3,956,531 | 5/1976 | Church et al. | 427/226 |
| 4,296,076 | 10/1981 | Swales et al. | 423/607 |
| 4,502,885 | 3/1985 | Cheney | 75/0.5 B |
| 4,731,111 | 3/1988 | Kopatz et al. | 75/0.5 BB |
| 4,773,928 | 9/1988 | Houck et al. | 75/10.19 |
| 4,808,217 | 2/1989 | Kopatz et al. | 75/0.5 B |
| 4,816,067 | 3/1989 | Kopatz et al. | 75/0.5 B |

*Primary Examiner*—John Doll
*Assistant Examiner*—Steven J. Bos
*Attorney, Agent, or Firm*—L. Rita Quatrini; Robert E. Walter

[57] ABSTRACT

A process is disclosed for producing chromium oxide powders, which comprises forming an aqueous slurry wherein the solids content is a mixture which consists essentially of in percent by weight about 5 to 15 chromium acetate and the balance chromium oxide, agglomerating the mixture, sintering the resulting agglomerated mixture in a hydrogen atmosphere at a temperature at about 1400° C. to about 1550° C. in metallic vessels, entraining the sintered chromium oxide powder in a carrier gas, passing the sintered chromium oxide powder and the carrier gas through a plasma flame at a power of about 10 to about 80 KW using an inert gas as the plasma gas, and cooling the resulting plasma heated chromium oxide powder to produce free flowing chromium oxide powder having a free chromium content of less than about 1% by weight.

3 Claims, No Drawings

PROCESS FOR PRODUCING FREE-FLOWING CHROMIUM OXIDE POWDERS HAVING A LOW FREE CHROMIUM CONTENT

BACKGROUND OF THE INVENTION

This invention relates to a process for producing free flowing chromium oxide powders by agglomerating chromium oxide powders with chromium acetate as the binder, sintering, and plasma processing. The resulting powders have less than about 1% by weight free chromium. The powders are suitable for plasma spray applications.

Chromium oxide powders are used in plasma spray applications. Normally this powder is produced by sintering or via arc melting and subsequent crushing. The high temperature sintering and arc melting processes can form free chromium. There is invariably post-heat treatment given to reduce the level of acid soluble constituents from greater than about 1000 weight ppm to less than about 500 weight ppm. If free chromium is present at greater than about 1000 weight ppm the wear properties and corrosion resistance of coatings made of this material are affected. In addition, flow characteristics and yields of the crushed product are often undesirable. Typically the powder is sprayed through a plasma and is used to coat a substrate such as steel. In this type of application the powder must be free-flowing. Spherical particles, due to their free-flowing nature are more desirable than non-spherical particles since they considerably reduce spraying time in a coating application.

Therefore a method to produce such powders that are low in free chromium and free flowing would be highly desirable and an advancement in the art.

SUMMARY OF THE INVENTION

In accordance with one aspect of the invention, there is provided a process for producing chromium oxide powders, which comprises forming an aqueous slurry wherein the solids content is a mixture consisting essentially of in percent by weight about 5 to about 15 chromiun acetate and the balance chromiun oxide, agglomerating the mixture, sintering the resulting agglomerated mixture in hydrogen at a temperature of about 1400° C. to about 1550° C. in metallic vessels, entraining the sintered chromium oxide powder in a carrier gas, passing the sintered chromium oxide powder and the carrier gas through a plasma flame at a power of about 10 to about 80 KW using an inert gas as the plasma gas, and cooling the resulting plasma heated chromium oxide powder to produce free flowing chromium oxide powder having a free chromium content of less than about 1% by weight.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention results in production of chromium oxide powders that are suitable for plasma spray applications such as spray coatings for steel substrates. The powders are free-flowing and have a free chromium content of less than about 1% by weight.

The starting material of the present invention is chromium oxide having the formula $Cr_2O_3$. Especially suitable is pigment grade $Cr_2O_3$ which is normally less than about 1 micrometer in diameter.

A uniform mixture is first formed of the starting chromium oxide and chromium acetate which serves as a binder. The mixture consists essentially of about 5% to about 15% by weight chromium acetate. The mixture is normally in the form of an aqueous slurry. The water content of the slurry is sufficient so that it can be easily agglomerated in the subsequent processing. Usually there are about 45% to about 55% by weight solids in the slurry.

The mixture is agglomerated typically by spray drying the slurry by techniques well known in the art. One preferred technique will be described in the example that follows.

The resulting agglomerated mixture is then sintered in a hydrogen atmosphere in metallic vessels which are normally boats. The sintering conditions are designed so that the amount of free chromium is controlled to less than about 1% by weight. When carbon boats are employed, free chromium levels are in excess of about 1% by weight. The sintering temperature is from about 1400° C. to about 1550° C. It is critical that this temperature be controlled in this range. It is desirable that the chromium oxide powder be black by visual examination. This is indicative of formation of a metastable non-stiochiometric oxide. Lower temperatures than the above range result in green powder. Higher temperatures can result in some decomposition of the oxide. During sintering the chromium acetate binder decomposes. Chromium oxide is formed as a result of this decomposition. The binder system of the present invention therefore causes no undesired reactions or by-products. For example, certain binders when they decompose can reduce the $Cr_2O_3$ and form free chromium or chromium carbide. This does not occur when chromium acetate is used.

The sintering serves to densify the powder so that it has some stregth for the subsequent plasma processing operation. Normally the powder is densified from a presintering apparent density of about 1.2 to about 1.3 g/cc to a post sintering density of about 1.5 to about 1.6 g/cc.

The resulting sintered powder is then plasma processed. The sintered powder is entrained in an inert carrier gas. The carrier gas is preferably argon or a mixture of argon and helium. The sintered powder and carrier gas are passed through a plasma flame. The plasma is an inert gas which is preferably argon or a mixture of argon and helium. The carrier gas and plasma gas must be inert to avoid any reactions of the powder.

Details of the principles and operation of plasma reactors are well known. The plasma has a high temperature zone, but in cross section the temperature can vary typically from about 5500° C. to about 17,000° C. A typical plasma incorporates a conical thoriated tungsten cathode, a water-cooled annular copper anode which also serves as a nozzle, a gas injection system and a powder injection system. Gases used are selected for inertness and/or energy content. These gases include but are not limited to argon, hydrogen, helium, and nitrogen. Plasma gun operating power levels are generally in the 15 to 80 KW range. The location of the powder injection port varies with the nozzle design and/or powder material. It is either in the nozzle (anode) throat (internal feed) or downstream of the nozzle exit (also called external feed). The plasma jet is not a uniform heat source. It exhibits steep temperature (enthalpy) and velocity gradients which determine the velocity and temperature achieved by the injected powder particles (agglomerates). In addition, the particle trajectories (and hence the temperature and velocity) are affected by the particle size, shape and thermophysical properties. The particle temperature is controlled by appropriately selecting the plasma operating conditions (plasma gas composition and flow rate and plasma gun power) and the injection parameters (injection port location and carrier gas flow rate). It is critical that the power be controlled to about 10 to about 80 KW. Higher power results in production of free chromium. In accordance with the present invention the powder can be fed into the plasma through the internal or external feeding mechanisms. However, the internal feeding mechanism is the preferred mode.

The data below shows the effect of atmosphere on the level of free Cr in the final powder product.

| Plasma gas | % by weight free Cr |
|---|---|
| H₂ | 21 |
| Ar | <1 |
| He | 0.4 |

It can be seen that with use of the inert gasses, the level of free chromium in the plasma processed product powder is less than about 1% by weight.

The densified chromium oxide particles of the present invention have a particle size normally of −100 mesh. The powder can be subsequently screened to obtain the desired particle size. Spray drying combined with plasma processing yields dense, spherical particles which have greater flowability than non-spherical particles.

The following data gives some physical properties of the chromium oxide powder of this invention and of chromium oxide powder produced by prior methods of arc melting and crushing.

|  | Hall flow | Apparent density |
|---|---|---|
| Prior method | No flow | 2–3 g/cc |
| This invention | 20–35 sec/50 g | 2–2.5 g/cc |

The data shows that the apparent density is retained when powder is processed according to the present invention. The flowability of the powder of the present invention is improved, which is a desirable property.

To more fully illustrate this invention, the following nonlimiting example is presented.

EXAMPLE

An aqueous slurry is made up in which the solids consist essentially of chromium oxide and about 10% by weight chromium acetate. The solids content of the slurry is about 49% by weight. The slurry is spray dried using a Proctor-Schwartz Model 3A spray dryer using Spraying Systems nozzle #60100/120. The outlet temperature is about 250° F. to about 260° F. The inlet temperature is about 360° F. to about 370° F. The atomizing air is introduced at about 30 psi. The resulting spray dried material is sintered for about 2½ hr at about 1475° C. followed by plasma densification and screening to obtain −270 mesh size. The free chromium content of the chromium oxide powder is <1% by weight.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing chromium oxide powders, said process comprising:
    (a) forming an aqueous slurry wherein the solids content is a mixture consisting essentially of in percent by weight about 5 to about 15 chromium acetate and the balance chromium oxide;
    (b) agglomerating said mixture;
    (c) sintering the resulting agglomerated mixture in a hydrogen atmosphere at a temperature of about 1400° C. to about 1550° C. in metallic vessels to form a sintered chromium oxide powder;
    (d) entraining said sintered chromium oxide powder in a carrier gas;
    (e) passing said sintered chromium oxide powder and said carrier gas through a plasma flame at a power of about 10 to about 80 kW using an inert gas as the plasma gas; and
    (f) cooling the resulting plasma heated chromium oxide powder to produce free flowing chromium oxide powder having a free chromium content of less than about 1% by weight.

2. A process of claim 1 wherein said carrier gas is selected from the group consisting of argon and a mixture of argon and helium.

3. A process of claim 1 wherein said plasma gas is selected from the group consisting of argon and a mixture of argon and helium.

* * * * *